US006456896B1

(12) United States Patent
Ito et al.

(10) Patent No.: US 6,456,896 B1
(45) Date of Patent: Sep. 24, 2002

(54) APPARATUS AND METHOD FOR THERMAL DISPLACEMENT CORRECTION FOR A MACHINE TOOL

(75) Inventors: Susumu Ito, Hino; Masao Kamiguchi, Minamitsuru-gun; Hisao Ishii, Tokyo; Masanobu Takemoto, Oshino-mura; Susumu Maekawa, Oshino-mura; Kunio Kojima, Oshino-mura, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/101,022

(22) PCT Filed: Nov. 11, 1997

(86) PCT No.: PCT/JP97/04103

§ 371 (c)(1),
(2), (4) Date: Jun. 29, 1998

(87) PCT Pub. No.: WO98/21006

PCT Pub. Date: May 22, 1998

(30) Foreign Application Priority Data

Nov. 11, 1996 (JP) ............................................. 8-312587

(51) Int. Cl.[7] .............................................. G06F 19/00
(52) U.S. Cl. ...................... 700/193; 700/194; 700/174; 700/192
(58) Field of Search ................................ 700/193, 174, 700/192, 194

(56) References Cited

U.S. PATENT DOCUMENTS

| | | | | |
|---|---|---|---|---|
| 3,579,073 A | * | 5/1971 | Johnstone | .................... 318/634 |
| 4,031,368 A | * | 6/1977 | Colding et al. | ......... 235/151.11 |
| 4,074,177 A | * | 2/1978 | Olig | ........................... 318/602 |
| 4,471,443 A | * | 9/1984 | Kinoshita et al. | ........... 364/474 |
| 4,502,108 A | * | 2/1985 | Nozawa et al. | ............. 364/170 |
| 4,602,874 A | * | 7/1986 | Neugebauer | ................. 384/476 |
| 4,702,685 A | * | 10/1987 | Fruntzek | ...................... 425/182 |
| 5,444,640 A | * | 8/1995 | Hirai | ...................... 364/474.35 |
| 5,476,137 A | * | 12/1995 | Ochiai et al. | .................. 165/30 |
| 5,581,467 A | * | 12/1996 | Yasuda | ................... 464/474.35 |
| 5,949,685 A | * | 9/1999 | Greenwood et al. | ... 364/474.35 |
| 6,019,506 A | * | 2/2000 | Senda | .......................... 374/55 |

FOREIGN PATENT DOCUMENTS

| | | |
|---|---|---|
| JP | 63-272447 | 11/1988 |
| JP | 2-100856 | 4/1990 |
| JP | 4-240045 | 8/1992 |
| JP | 5-116053 | 5/1993 |
| JP | 5-277894 | 10/1993 |
| JP | 7-246546 | 9/1995 |

* cited by examiner

Primary Examiner—Peter Wong
Assistant Examiner—Tim Vo
(74) Attorney, Agent, or Firm—Staas & Halsey LLP

(57) ABSTRACT

The position of a feed shaft is monitored, the mean moving speed and moving frequency of the feed shaft are measured with every unit time for position correction, and a correction amount δn is determined from the speed and frequency according to an approximation formula and updated (c7 and c8). A position correction amount for a commanded position is determined from this correction amount, and the commanded position is corrected by the position correction amount (c1 to c6). The position correction amount for the commanded position is determined from this correction amount, and the commanded position is corrected by this position correction amount. Since the correction amount is determined according to the approximation formula, thermal displacement correction can be effected at all times without requiring any sensor. When the correction amount changes substantially (c10), the thermal displacement is measured by means of a sensor and used as the correction amount (c11 and c12), whereby accuracy is improved. The frequency of measurement by means of sensors is reduced, so that the machining time can be reduced.

20 Claims, 10 Drawing Sheets

APPARATUS AND METHOD FOR THERMAL DISPLACEMENT CORRECTION FOR A MACHINE TOOL

TECHNICAL FIELD

The present invention relates to a thermal displacement correction method for a machine tool, and an apparatus for implementing the method.

BACKGROUND ART

In a machine tool, a feed screw and a main spindle are driven by means of a motor. Therefore, the main spindle and the feed screw are expanded by heat from the motor, frictional heat from rotating bearings, and frictional heat from an engaging portion between a ball screw and a ball nut of the feed screw, causing the displacement of the machine position. That is, the relative positions of a workpiece to be positioned and a tool are displaced. The change in machine position that is attributed to heat gives rise to problems in high-accuracy machining.

Conventionally, to prevent the thermal displacement of the machine, methods such as the following have been employed.

(a) providing a cooling device and applying initial tension to the ball screw of the feed screw, thereby providing a structure that is free from influences of thermal expansion, or (b) providing a displacement sensor and a temperature sensor so that commanded positions can be corrected in accordance with detected displacements and detected temperatures.

The aforesaid method (a), in which the structure that is free from influences of thermal expansion is provided by applying initial tension to the ball screw of the feed screw, and the method (b), in which thermal displacement is corrected by means of the sensors, are subject to the problem of structural limits and the problem in sensor attachment positions, and require means for protecting the sensors against a coolant and cuttings to ensure reliability. In the case where the sensors are used, moreover, measurement takes a lot of time, so that the machining time is long, and a first-transition displacement cannot be corrected.

DISCLOSURE OF THE INVENTION

An object of the present invention is to provide a thermal displacement correction method capable of easily correcting thermal displacement at low cost without requiring use of sensors.

Another object is to provide a thermal displacement correction method capable of effecting more accurate thermal displacement correction by being used in combination with sensors. Additional objects and advantages of the invention will be set forth in part in the description which follows and, in part, will be obvious from the description, or may be learned by practice of the invention.

In order to achieve the above objects, in a thermal displacement correction method for a machine tool controlled by means of a numerical control device according to the present invention, an approximation formula for obtaining a correction amount against a thermal displacement from the mean moving speed and moving frequency of a feed shaft and an approximation formula for obtaining a position correction amount for a commanded position from the correction amount obtained according to said approximation formula are previously stored in the numerical control device, whereby the position of the feed shaft is monitored to determine the mean moving speed and moving frequency of the feed shaft, determine the position correction amount for the commanded position of the feed shaft according to said approximation formula, and correct the commanded position by said position correction amount and output the corrected commanded position.

Preferably, an approximation formula for determining a correction amount against a thermal displacement of an axis during a power-off time of the machine tool is previously stored in the numerical control device, the time when the machine tool is disconnected from the power source and a correction amount for said time are stored in advance, and a correction amount is determined from the previously stored correction amount and the power-off time according to said approximation formula when the machine tool is reconnected to the power source and is used as a correction amount for the time of reconnection to the power source.

According to the present invention, dislocation attributable to thermal displacements of the feed shaft and a main spindle can be corrected without using sensors, so that not only costs can be reduced but also the reliability of sensors need not be taken into consideration. Further, since the thermal displacement correction can be effected at all times, the thermal displacement correction can be made even at the time of the start of machining, so that the machining accuracy can be improved.

Further, the position correction accuracy can be enhanced by being combined with a method in which thermal displacements are measured to determine correction amounts by means of sensors. In this method, the frequency of measurement by means of the sensors can be reduced, so that the overall machining time can be made shorter than in the case where thermal displacements are measured for position correction only by means of sensors.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
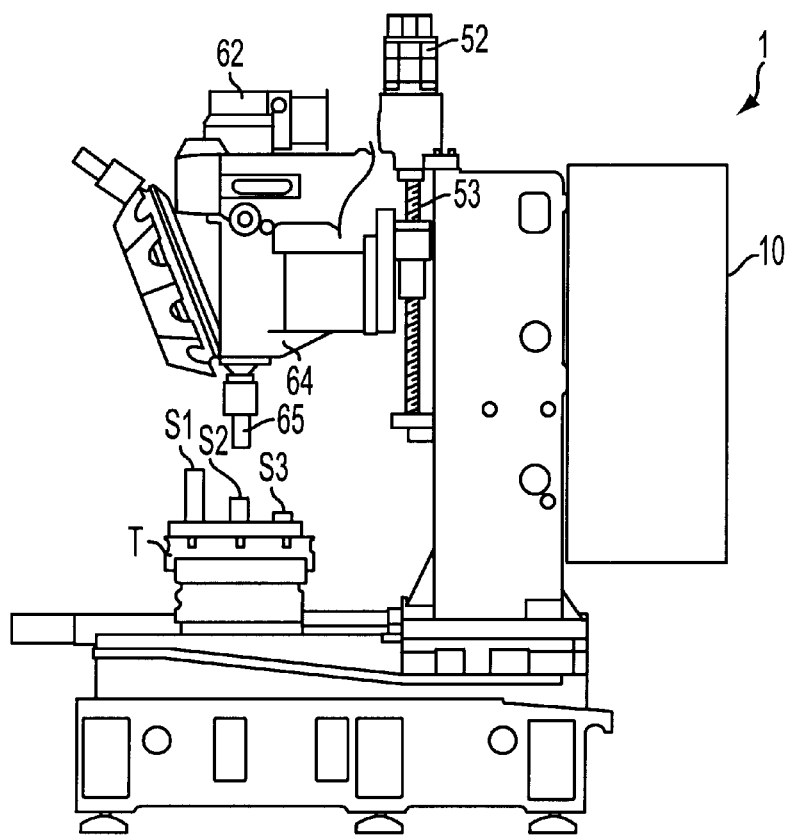
FIG. 1 is a schematic view of a vertical drilling machine to which one embodiment of the present invention is applied.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 1, an outline of a vertical drilling machine 1, as an example of a machine tool to which the present invention is applied, will be described.

The drilling machine 1 is controlled by a numerical control device (CNC) 10 used as a control device. A main spindle 64 of the vertical drilling machine 1 is fitted with a tool 65, and is driven by a spindle motor 62. A Z-axis servomotor 52 drives a ball screw 53 for the Z-axis, which is a vertical feed shaft. A table T is controlled for movement in the X- and Y-axis directions that are perpendicular to the Z-axis and to each other. Since the construction of the vertical drilling machine 1 shown in FIG. 1 is not different from that of the conventional one, further description thereof is omitted.

Figure 2:
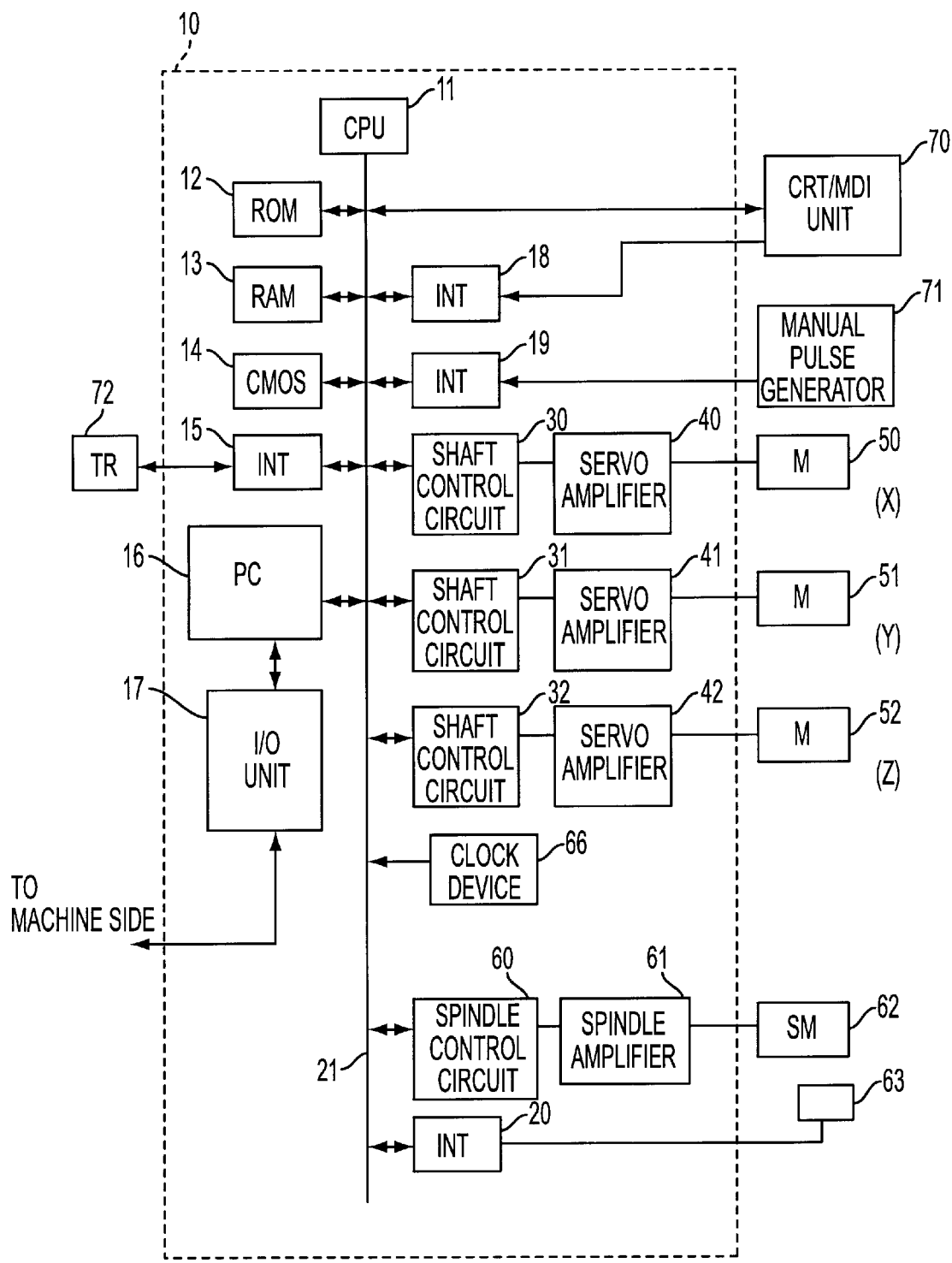
FIG. 2 is a block diagram of a numerical control device according to the embodiment.

Referring now to the functional block diagram of FIG. 2, the principal part of the numerical control device 10 of the vertical drilling machine 1 will be described.

A processor 11 of the numerical control device 10 is a processor for generally controlling the numerical control device 10. The processor 11 reads out system programs stored in a ROM 12 through a bus 21 and generally controls the numerical control device 10 in accordance with the system programs. A RAM 13 is loaded with temporary calculation data, display data, various data inputted through a CRT/MDI unit 70 by an operator, and the like.

A CMOS memory 14, which is backed up by a battery (not shown), is composed as a nonvolatile memory whose storage can be maintained even when numerical control device 10 is turned off, and is stored with a thermal displacement measurement program, a correction amount updating processing program, which will be described later, a machining program input through an interface 15, which will be described later, and a machining program input through CRT/MDI unit 70 and the like. Further, the ROM 12 is previously loaded with various system programs for carrying out edit mode processing necessary for the generation and editing of the work programs and processing for automatic operation.

An interface 15 is an interface for external apparatuses that can be connected to the numerical control device 10, and is connected with external apparatuses 72, such as a paper tape reader, paper tape puncher, external memory device, etc. The machining programs, thermal displacement measurement program, etc. are read from the paper tape reader and the external memory device, while the machining programs edited in the numerical control device 10 can be output to the paper tape puncher and the external memory device.

A programmable controller (PC) 16 controls auxiliary devices on the side of the vertical drilling machine (machine tool) 1 in accordance with sequence programs stored in the numerical control device 10. That is, according to M function, S function, and T function instructed in the work program, signals necessary on the auxiliary device side are produced by the sequence program and delivered from an I/O unit 17 to the auxiliary device side. The auxiliary devices, such as various actuators, are actuated by these output signals. Further, necessary processing is carried out in response to signals from various switches of a control panel in the body of the machine tool 1, and is delivered to the processor 11.

Data on the current positions of the individual axes of the vertical drilling machine 1, alarms, parameters and picture signal such as that for image data are fed to the CRT/MDI unit 70 and displayed on its display. The CRT/MDI unit 70 is a manual data input device that is provided with the display, keyboard, etc. An interface 18 receives data from the keyboard of the CRT/MDI unit 70 and delivers them to the processor 11. An interface 19 is connected to a manual pulse generator 71, and receives pulses from the manual pulse generator 71. The manual pulse generator 71 is mounted on the control panel of the vertical drilling machine 1, and is used to position moving parts of the machine tool 1 accurately by individual-axis control using distribution pulses based on manual operation.

X- and Y-axis control circuits 30 and 31 for moving the table T and Z-axis control circuit 32 for controlling the z-axis of the vertical drilling machine 1 receive individual axial movement commands from the processor 11, and deliver the individual-axis commands to servo amplifiers 40 to 42, respectively. In response to these commands, the servo amplifiers 40 to 42 drive individual axis servomotors 50 to 52 of the vertical drilling machine 1, respectively. Each of axis servomotors 50 to 52 has a built-in pulse coder for position detection. Position signals from these pulse coders are fed back as a pulse train. In some cases, a linear scale is used as a position detector. A speed signal can be generated by F/V (frequency/speed) conversion of the pulse train. In FIG. 2, a description of the feedback of these position signals and speed feedback is omitted.

In response to a main spindle rotation command to the vertical drilling machine 1, a spindle control circuit 60 delivers a spindle speed signal to a spindle amplifier 61. On receiving this spindle speed signal, the spindle amplifier 61 makes the spindle motor 62 of the vertical drilling machine 1 rotate at a commanded rotational speed, thereby driving the tool 65. A position coder 63 is coupled to the spindle motor 62 by means of a gear or belt. The position coder 63 outputs a feedback pulse in synchronism with the rotation of the main spindle 64, and the feedback pulse is read through an interface 20 by the processor 11. Numeral 66 denotes a clock device that is adjusted so as to be synchronous with the current time. Displacement measurers (detection switches) S1, S2 and S3, which are attached to the table T of the vertical drilling machine 1 in order to obtain later-described thermal displacement data, are connected to the I/O unit 17, and on-off state of each detection switch is checked by the processor 11 through the PC 16.

The displacement measurers S1, S2 and S3 according to the present embodiment are designed so as to detect the contact with workpiece of the working surface of the tip of the tool 65 from the Z-axis direction. If necessary, however, there may be provided a displacement measurer for detecting the contact of the outer peripheral working surface of the tool from the X-axis direction or a displacement measurer for detecting the contact of the outer peripheral working surface of the tool from the Y-axis direction.

Figure 3:
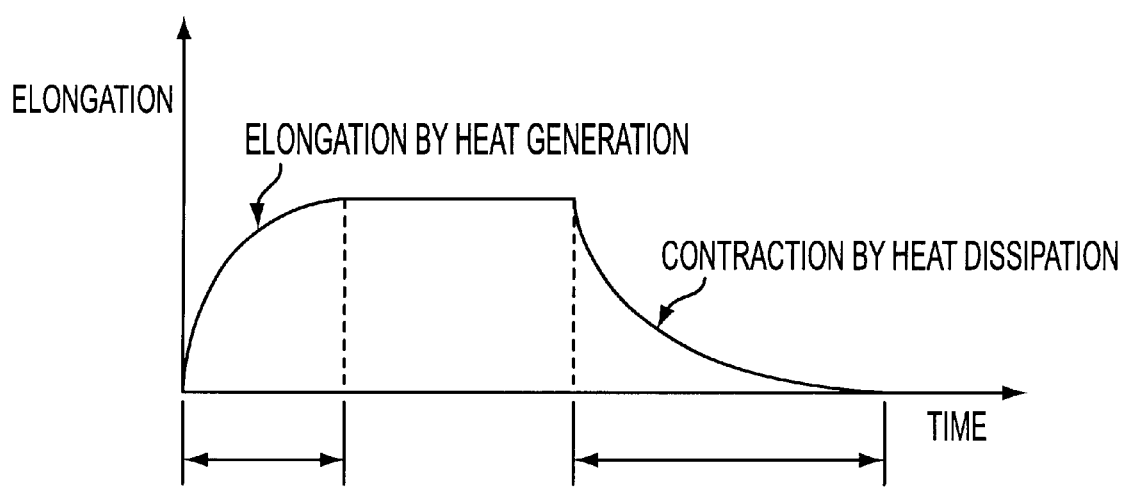
FIG. 3 is a conceptual diagram showing elongation of a feed shaft, such as a ball screw, since the start of operation of a machine tool and contraction after the stoppage of the operation.

FIG. 3 is a conceptual diagram showing the way a ball screw that constitutes a feed screw elongates when the feed screw is driven and the way the ball screw contracts as it gives off heat when machining is stopped. When the ball screw is driven, the ball screw elongates due to heat generation attributable to friction on bearing portion. This elongation is sharp at the first stage, but when heat generation and heat dissipation are balanced, the increase of the elongation slows down. When the machining is suspended so that the movement of the feed screw is stopped, on the other hand, the ball screw contracts by giving off its heat as represented by the time-based thermal displacement curve shown in FIG. 3. Thus, in the present invention, the machine tool (the vertical drilling machine 1) is operated for experiment to determine the thermal displacement curve of the ball screw affected by the heat and the dissipation of the heat, and, based on the determined thermal displacement curve, an approximation formula for predicting approximate thermal displacement is developed and stored in a memory. By doing so, when actually machining using the vertical drilling machine 1 (machine tool) the commanded position can be corrected utilizing the thermal displacement approximation formula.

Then, an experiment is conducted to obtain thermal displacement data on the Z-axis ball screw, using the Z-axis of the vertical drilling machine 1, and another experiment is conducted to obtain thermal displacement data due to heat generation attributed to the drive of the main spindle by driving the main spindle 64.

First, the displacement measurers S1, S2 and S3 for measuring displacements at −50 mm, −150 mm, and −300 mm positions on the Z-axis are attached to the table T, the tool (end mill or the like) 65 having a flat tip is mounted on the main spindle 64, and the displacement measurement program is loaded into the nonvolatile memory 14 through the interface 15. Further, as for the Z-axis, its stroke, speed, frequency, displacement data measurement interval, and drive time (frequency is set as the product of the displacement data measurement interval and the measurement frequency), and displacement data measurement termination time (measurement frequency is set) are set through the CRT/MDI 70, in order to obtain the thermal displacement data, and the execution of the thermal displacement measurement program is commanded.

Figure 4:
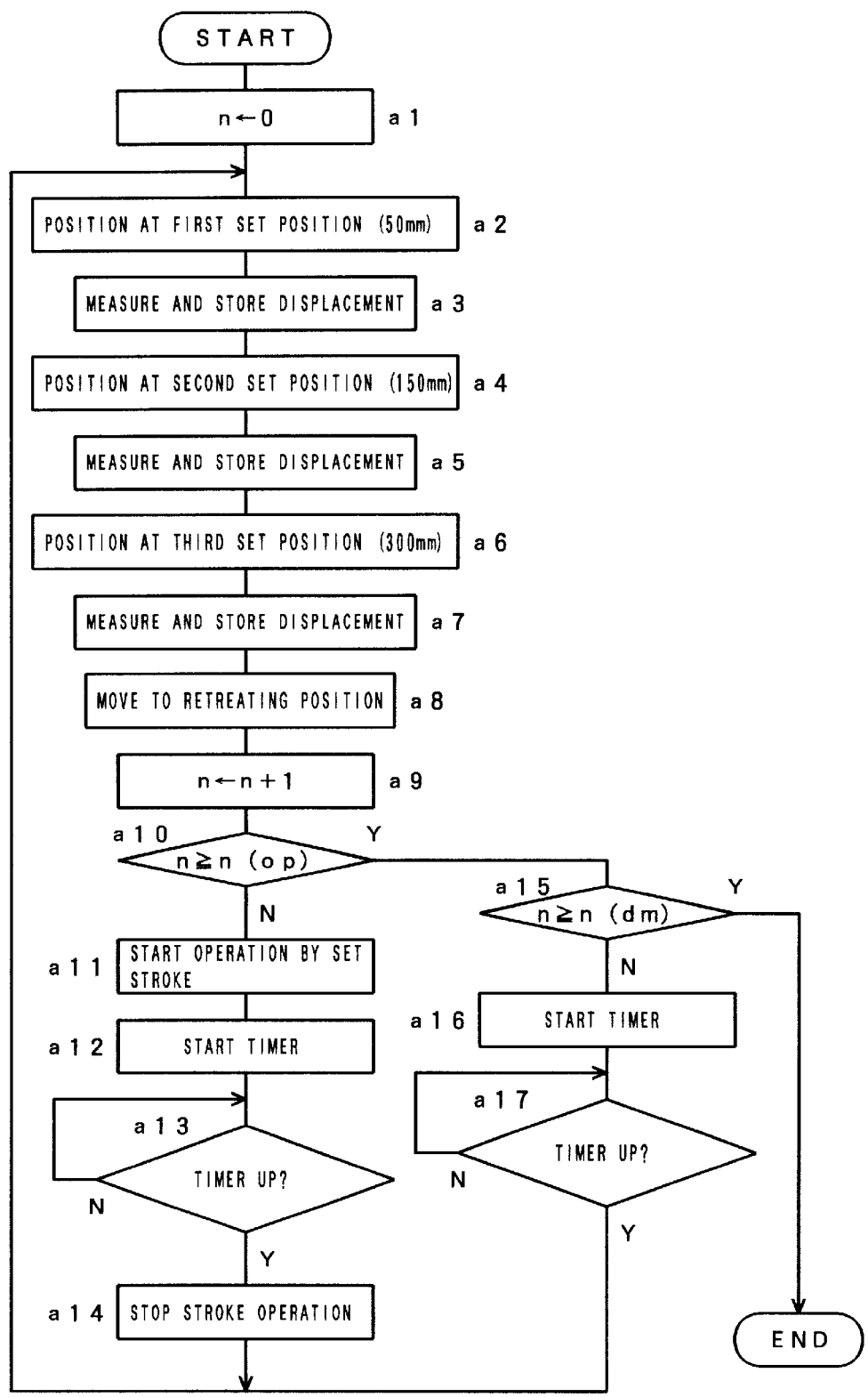
FIG. 4 is a flowchart for thermal displacement measurement on the feed shaft.

When a command for the execution of the thermal displacement measurement program is inputted, the processor 11 starts the processing shown in FIG. 4. First, after a counter n for counting the measurement frequency is set to "0" (Step a1), the X-axis and the Y-axis are driven to move the table T, and the displacement measurer S1 for detecting the −50 mm position on the Z-axis is situated on the axis of the main spindle 64 (Step a2). Then, the Z-axis is driven to lower the displacement measurer S1 until it is turned on by detecting the tip of the tool 65. When an ON-signal is inputted from the displacement measurer S1, the then position z(−50) on the Z-axis is read. A deviation between the read position z(−50) and −50 mm is obtained and stored in a table on the RAM 13 (Step a3).

Then, the Z-axis is raised, the X- and Y-axes are driven to move the table T, and the displacement measurer S2 for detecting the −150 mm position on the Z-axis is situated on the axis of the main spindle 64 (Step a4). Then, the Z-axis is driven to lower the displacement measurer S2 until it is turned on by detecting the tip of the tool 65. When an ON-signal is inputted from the displacement measurer S2, the then position z(−150) on the Z-axis is read. A deviation between the read position z(−150) and −150 mm is obtained and stored in the table on the RAM 13 (Step a5).

Then, the Z-axis is raised again, the X- and Y-axes are driven to move the table T, and the displacement measurer S3 for detecting the −300 mm position on the Z-axis is situated on the axis of the main spindle 64 (Step a6). Then, the Z-axis is driven to lower the displacement measurer S3 until it is turned on by detecting the tip of the tool 65. When an ON-signal is inputted from the displacement measurer S3, the then position z(−300) on the Z-axis is read. The deviation between the read position z(−300) and −300 mm is obtained and stored in the table on the RAM 13 (Step a7).

Then, the table T is retreated to a position where the tool 65 and the displacement measurers S1 to S3 will not come into contact (Step a8), "1" is added to the value in the counter n, and it is determined whether or not the value n in this counter is not lower than a measurement frequency n(op) set as an operating time (Steps a9 and a10). If n(op) is not reached by the value n in the counter, the stroke set for the Z-axis is started, a measurement interval time set in a timer is set, the timer is started, and the Z-axis stroke motion is continued until the set time of the timer is up (Steps a11 to a13). When the set time of the timer is up, the stroke motion is stopped (Step a14), and the program returns to Step a2, thereby repeating the aforesaid process of displacement measurement.

Thereafter, the aforesaid processes of Steps a2 to a14 are executed until the counter value n becomes equal to or higher than the measurement frequency n(op) set as the operating time, and measured position displacement data are stored in the table on the RAM 13.

When the counter value n has reached the set value n(op), it is then determined whether or not the counter value n is not lower than a measurement frequency n(dm) set as the displacement data measurement termination time (Step a15). If n(dm) is not reached by the counter value n, the measurement interval time is set and the timer is started. When the set time of the timer is up (Steps a16 and a17), the program returns to Step a2, whereupon the position displacement data are measured and stored in the table on the RAM 13.

The processes of Steps a2 to a10 and a15 to a17 are executed until the counter value n becomes equal to the set value n(dm). When the set value n(dm) is reached at last, this thermal displacement measurement process is finished.

Figure 5:
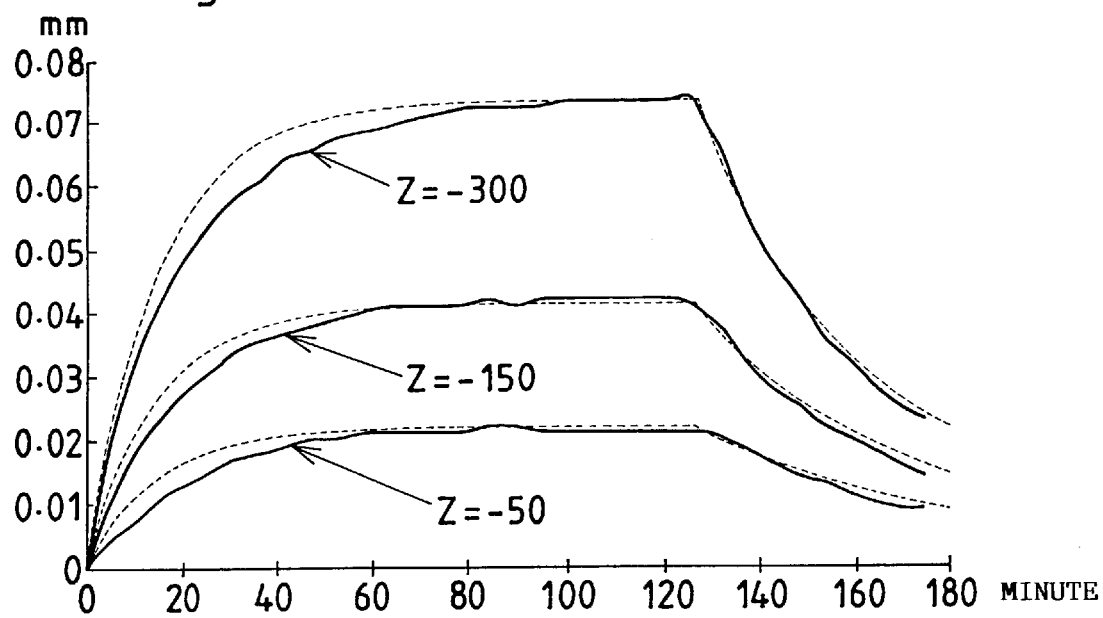
FIG. 5 shows displacement curves representing the results of a measurement test on thermal displacements attributable to 300-mm stroke movement.

FIG. 5 shows displacement curves (curves given by full lines) obtained by plotting the results of measurement of displacements for Z=−50 mm, −150 mm, and −300 mm by means of an XY-plotter that is connected to the interface 15. In this case, the Z-axis is driven for 120 minutes (this 120 minutes is equivalent to the aforesaid n(op)) with the moving speed of the Z-axis set to 30 m/min for 30 cycles per minute, stroke to 300 mm (Z=0 to −300 mm), and displacement data measurement interval to 5 minutes.

Figure 6:
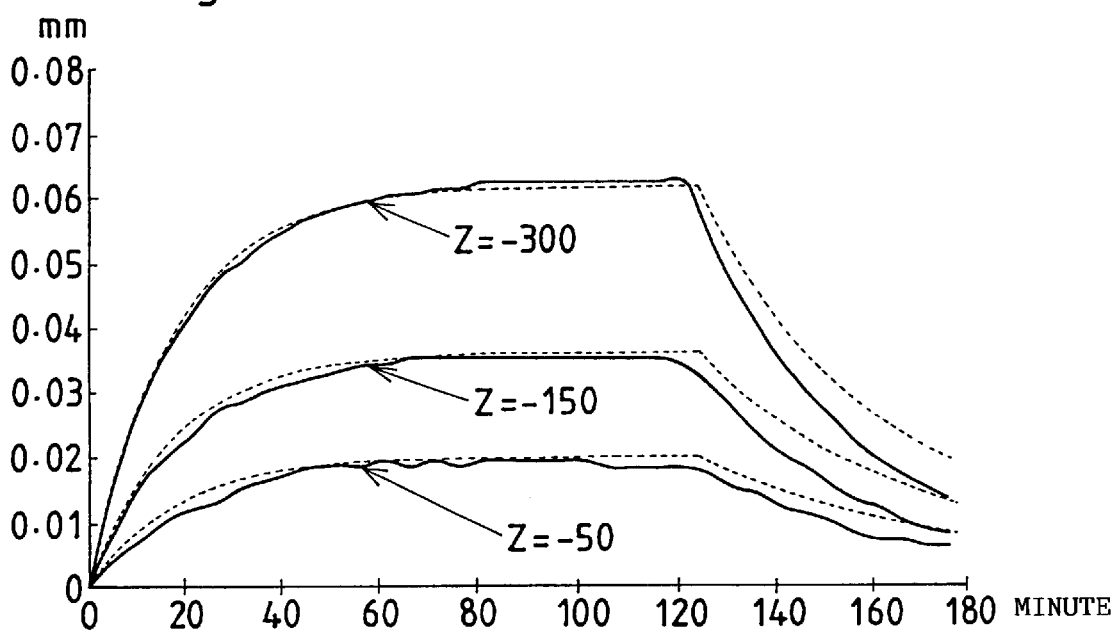
FIG. 6 shows displacement curves representing the results of a measurement test on thermal displacements based on a changed moving speed.

FIG. 6 shows displacement curves (curves given by full lines) representing the results of measurement of displacement with the moving speed of the Z-axis shaft changed to 15 m/min, half the moving speed for the case of FIG. 5, and with other set values identical with those for the case of FIG. 5.

Figure 7:
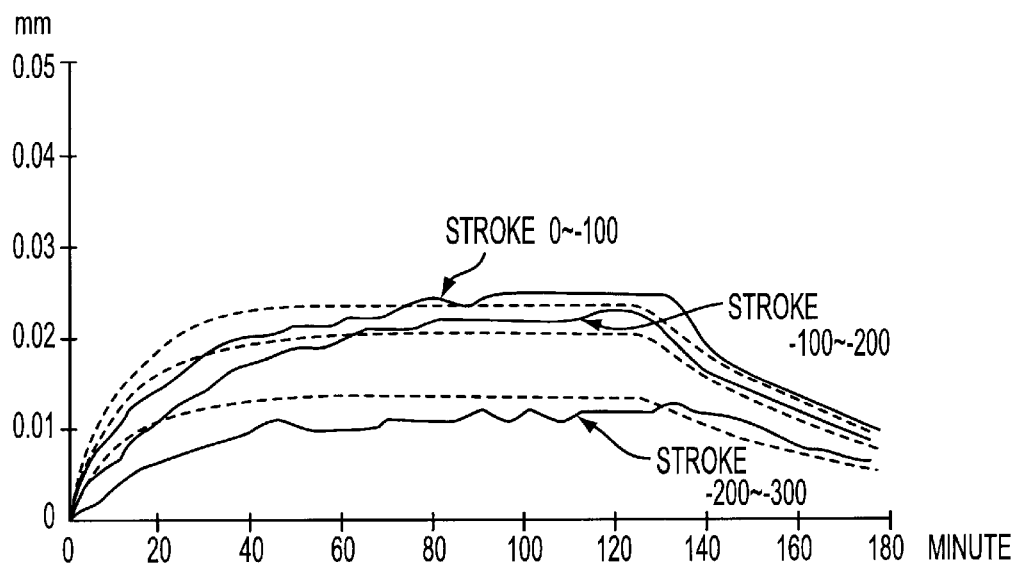
FIG. 7 shows displacement curves representing the results of a measurement test on thermal displacements based on a changed stroke.

FIG. 7 shows displacement curves representing results obtained by measuring the displacement of Z=−150 mm (displacement measurer S2) at intervals of 5 minutes with the stroke changed to Z=0 to −100 mm, −100 mm to −200 mm, and −200 to −300 mm and with the Z-axis reciprocated 30 times per minute at the moving speed of 30 mm/min.

Approximation formulas matching the displacement curves are obtained from these displacement curves, and these approximation formulas are used as approximation formulas for determining the correction amount. Curves given by broken lines in FIGS. 5 to 7 represent curves based on the obtained approximation formulas.

Correction Amount for Thermal Displacement of Moved Axis

According to the present embodiment, the mean moving speed and moving frequency per unit time t(pc) (=36 seconds) for position correction for each moving axis are obtained by monitoring the position of each moving axis with every predetermined sampling time $\Delta T$ (72 milliseconds), and an approximation formula for predicting the thermal displacement is induced as follows:

$$\delta n = \delta n{-}1 + Qn - qn, \quad (1)$$

where $\delta n$: correction amount (thermal displacement), $Qn$: displacement by heat generation per unit time t(pc) for position correction, $qn$: displacement by heat dissipation per unit time t(pc) for position correction, n: number (1, 2, 3, ..., n, ...) that increases one by one with the passage of the unit time t(pc) for position correction.

Here the displacement $Qn$ attributable to heat generation per unit time t(pc) for position correction is defined as follows:

$$Qn = A \cdot [f(Bn)]^r \cdot Cn^s,$$

where

A: coefficient,

Bn: mean moving speed, r: coefficient,

Cn: moving frequency, s: coefficient.

Here the mean moving speed Bn is obtained according to the following expression:

$$Bn = [(|x1-x0|/\Delta T) + (|x2-x1|/\Delta T) + \ldots + (|xi-xi{-}1|/\Delta T) + \ldots + (|xN-xN{-}1|/\Delta T)]/K,$$

where xi: position of each moving axis (i=0, 1, 2, ..., N), $\Delta T$: sampling time (e.g., 72 milliseconds), K: number of data with the speed for the unit time t(pc) for position correction not at 0, N: total number of data obtained in the unit time t(pc) for position correction (e.g., N=36/(72/1000)=500 if t(pc) is 36 seconds), and f(Bn)=Bn·f(xi) is given. In this case, we have f(xi)=γ·xi, where γ is a coefficient.

The moving frequency Cn is given by Cn=K/N.

The displacement qn by heat dissipation per unit time t(pc) for position correction is defined by the following expression:

$$qn = D \cdot F(\delta n{-}1),$$

where

D: coefficient associated with heat dissipation, $\delta n{-}1$: pre-displacement.

$F(\delta n{-}1)$ is defined as $F(\delta n{-}1) = \delta n{-}1^u$.

Since the displacement varies depending on the axis position (commanded position), as shown in FIGS. 5 and 6, the correction amount is calculated with commanded position as a parameter. This correction amount based on the commanded position, as a parameter, is called a position correction amount. This position correction amount $\Delta n$ is obtained according to the following expression:

$$\Delta n = f(x) \cdot \delta n, \quad (2)$$

where x: commanded position.

Here $f(x) = x^v$ is given, and v is a coefficient.

The displacement curves of FIGS. 5, 6 and 7 are obtained experimentally, and the respective optimum values of the aforesaid coefficients A, D, r, s, γ, u and v are obtained so that the correction amount $\Delta n$ matches the displacement curves. In consequence, the curves given by broken lines in FIGS. 5, 6 and 7 represent position correction amounts (displacement curves) obtained using the function of the approximation formula for obtaining the position correction amount $\Delta n$.

Figure 8:
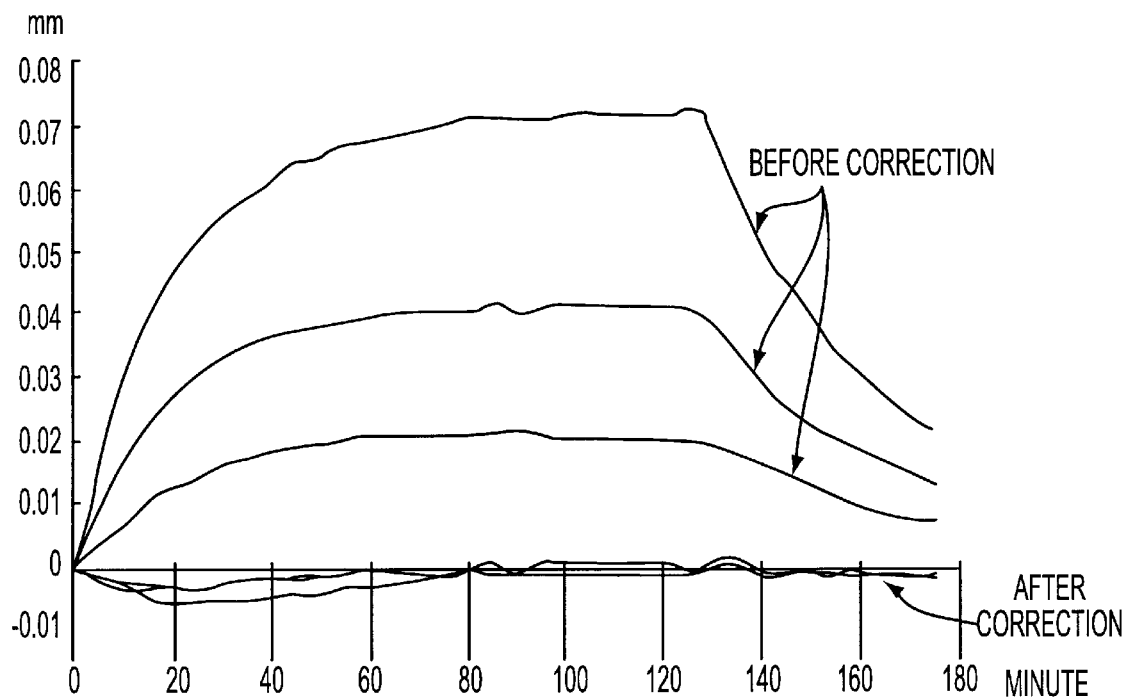
FIG. 8 shows displacement curves representing position displacements before thermal displacement correction and after correction according to the present invention.

FIG. 8 shows an example of the results of correction obtained by subtracting the correction amount from the commanded position by the use of the coefficients and approximation formulas obtained from this experiment. FIG. 8 shows corrected displacements that are obtained after movement at the speed of 30 m/min, 30 cycles/min and the stroke of 300 mm. Thermal displacements are corrected in the case shown in FIG. 8, whereby more accurate positions are obtained.

Thermal Displacement Correction Amount Based on Rotation of Main Spindle

Figure 9:
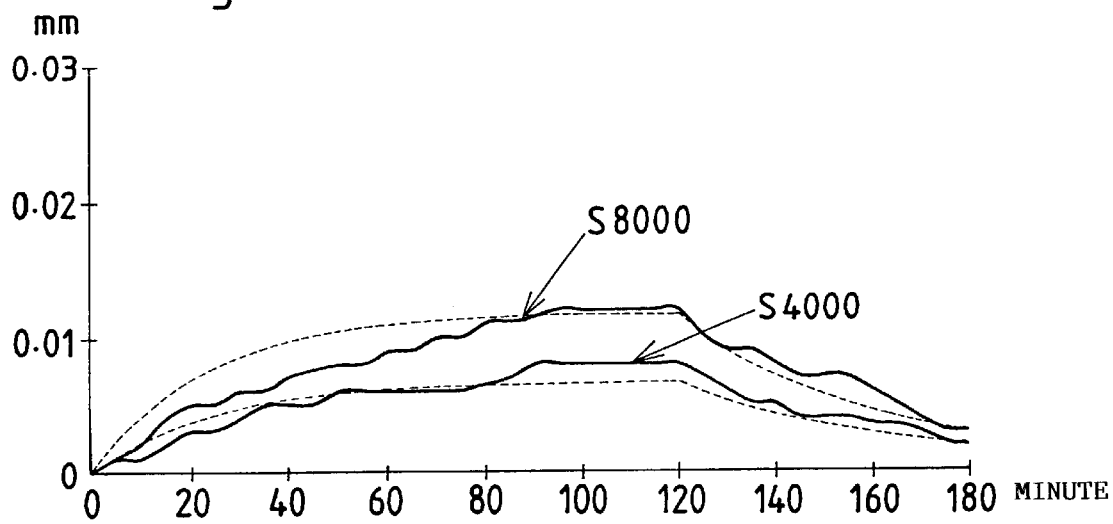
FIG. 9 shows displacement curves representing thermal displacements attributable to the rotation of a main spindle.

Then, the thermal displacement of the main spindle, caused as the main spindle is rotated, is measured. In this case, the thermal displacement of the main spindle develops as a position displacement of the z-axis, so that the position displacement of the z-axis is measured to determine the thermal displacement of the main spindle. The main spindle is rotated experimentally at 4,000 rpm and 8,000 rpm, and the thermal displacement of the main spindle is measured at intervals of 5 minutes, whereupon the experimental results shown in FIG. 9 are obtained. Based on these experimental results, an approximation formula predicting the thermal displacement of the main spindle is obtained as follows by monitoring the rotational speed of the main spindle:

$$\delta n = \delta n{-}1 + Qn - qn, \quad (3)$$

where $\delta n$: correction amount, $Qn$: displacement by heat generation per unit time t(pc) for position correction, $qn$: displacement by heat dissipation per unit time t(pc) for position correction.

Here the displacement $Qn$ attributable to heat generation per unit time t(pc) for position correction is obtained according to the following expression:

$$Qn = E \cdot f(Sn)^w$$

where

E: coefficient associated with heat generation,

Si: number of rotation of a main spindle during sampling time $\Delta T$ w: coefficient.

Further, f(Sn) is obtained according to the following expression:

$$f(Sn)=(S1/\Delta T)+(S2/\Delta T)+(Si/\Delta T)\ldots+(SN/\Delta T),$$

where $\Delta T$: sampling time,

N: total number of data obtained in the unit time t(pc) for position correction.

Further, the displacement qn by heat dissipation per unit time t(pc) for position correction is obtained according to the following expression:

$$qn=R\cdot\delta n-1^h,$$

where

R: coefficient associated with heat dissipation, h: coefficient.

Figure 10:
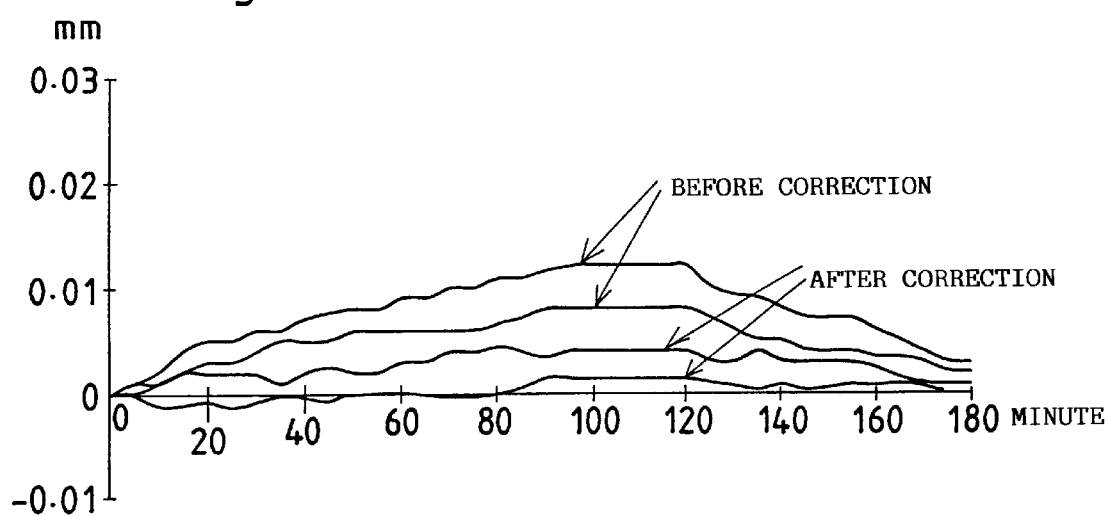
FIG. 10 shows displacement curves representing position displacements before correction of the thermal displacement of the main spindle and after correction according to the present invention.

FIG. 10 shows an example of results obtained by correcting the commanded position on the Z-axis by the aforesaid approximation formula after obtaining the respective optimum values of the aforesaid coefficients E, R, w and h matching the experimentally obtained displacement curves of FIG. 9.

Thermal Displacement Correction Amount at Restart of Machine Operation

When resuming the operation of the machine tool after having been stopped for a short period of time, the feed screw and the like still remains expanded by heat. Therefore, the time at which the power source of the machine tool is turned off and the aforesaid correction amount are stored in advance so that the correction amount $\delta$on at a time when the power source is turned on again can be approximated, based on the previously stored time at which the power source is turned off and the correction amount $\delta$off at the time, by using the following calculation formula for approximation.

$$\delta on=\delta off-(q1+q2+\ldots qj+qT), \quad (4)$$

where $qj=D\cdot\delta n-1^a$, or $qj=R\cdot\delta n-1^h$, $T=(Ton-Toff)/t(pc)$, where Ton: power-on time, Toff: power-off time, t(pc): unit time for position correction (=N·$\Delta T$).

Figure 11:
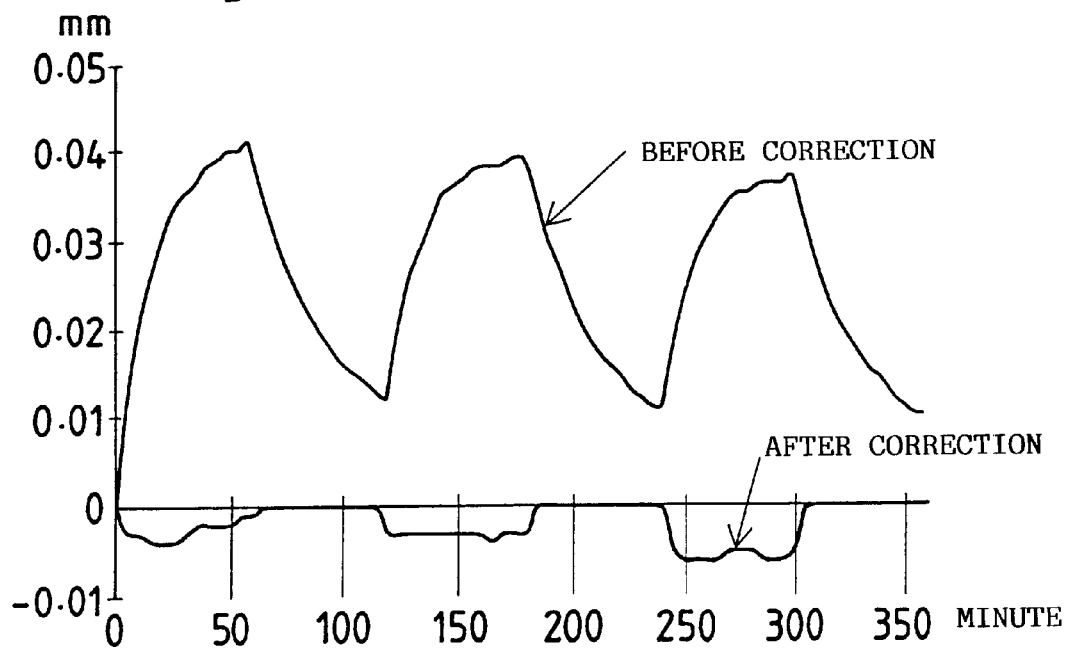
FIG. 11 shows displacement curves representing position displacements before thermal displacement correction for the power-off time and after correction according to the present invention.

FIG. 11 is a diagram showing displacements before and after correction for Z=-150 by repeating 60-minute operation with a speed of 30 m/min, 30 cycles/min and a stroke of 300 mm and 60-minute power-off time.

Displacement Correction by Lubrication Method

Figure 12:
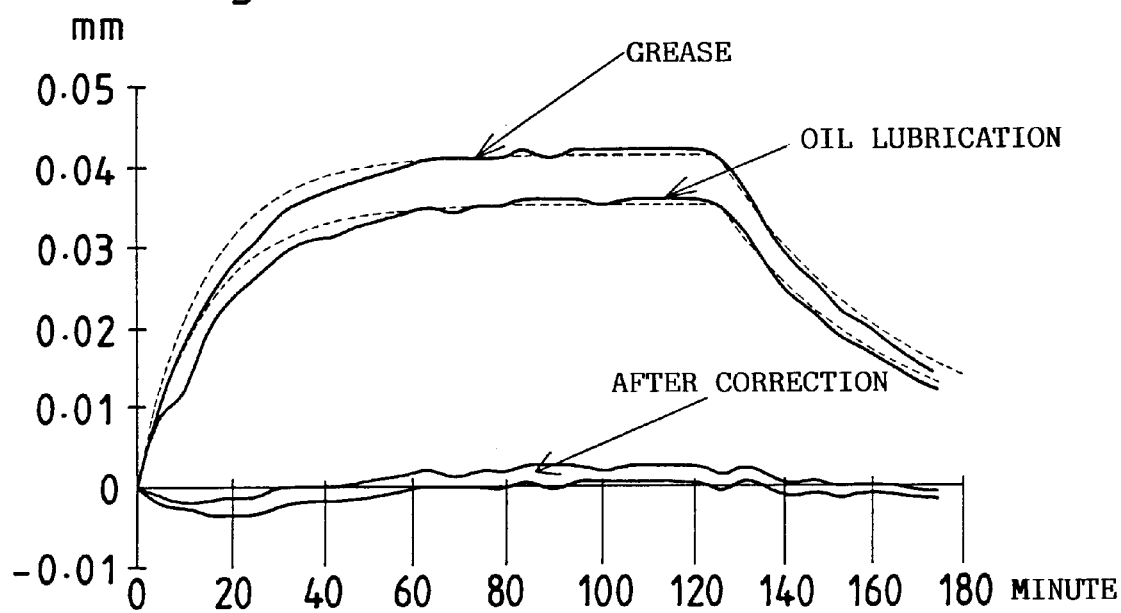
FIG. 12 shows displacement curves representing thermal displacements depending on the lubrication method and a displacement after correction.

Further, the displacement may vary depending on the lubrication method. For example, grease lubrication entails higher calorific value than oil lubrication, so that it results in a higher displacement. FIG. 12 shows pre- and post-correction displacement curves representing experimental results for the cases of the grease and oil lubrication methods. This experiment exhibits a position displacement of Z=-150 mm with a speed of 30 m/min, 30 cycles/min and 30-mm stroke.

Then, the correction amount $\delta n$ is multiplied by a coefficient for correction as follows:

$$\delta n'=H\cdot\delta n, \quad (5)$$

where H is a coefficient.

The optimum value of the coefficient H is obtained experimentally. The correction by this lubrication method is effected by a difference in calorific value based on the lubrication method. Therefore, the coefficient H is included in the coefficients A and E of expressions (1) and (2) for the displacements Qn of the feed shaft and the main spindle, based on heat generation per unit time t(pc) for position correction, so that the coefficients A and E are replaceable depending on the lubrication method.

Displacement Correction by Load

Further, the displacement varies depending on loads (cutting force, table bearing weight, etc.) that act on the machine. Then, a disturbance load torque is determined by means of an observer or the like, and the correction amount $\delta n$ is multiplied by a coefficient for correction as follows:

$$\delta n'=Mn\cdot\delta n, \quad (6)$$

where Mn is a coefficient associated with the disturbance load torque, and is represented by the following expression:

$$Mn=I\cdot f(RN)/Rf,$$

where

I: coefficient,

Ri: disturbance load torque (i=1, 2, ... N)

Rf: reference torque.

Further, f(RN) is obtained from the following expression:

$$f(RN)=(R1+R2+\ldots+RN)/N.$$

The optimum value of the coefficient I is also obtained experimentally.

Then, the aforesaid expressions (1) to (4) and (6) are set in the nonvolatile memory 14. Since the coefficients A and E are replaceable depending on the lubrication method, expression (5) is not set. In operating the vertical drilling machine (machine tool) 1, the feed shaft position xi, main spindle rotational frequency Si, disturbance load torque R are detected and stored with every sampling time $\Delta T$, the correction amount and position correction amount are determined at every unit time t(pc) for position correction, and the commanded position is corrected.

Figure 14:
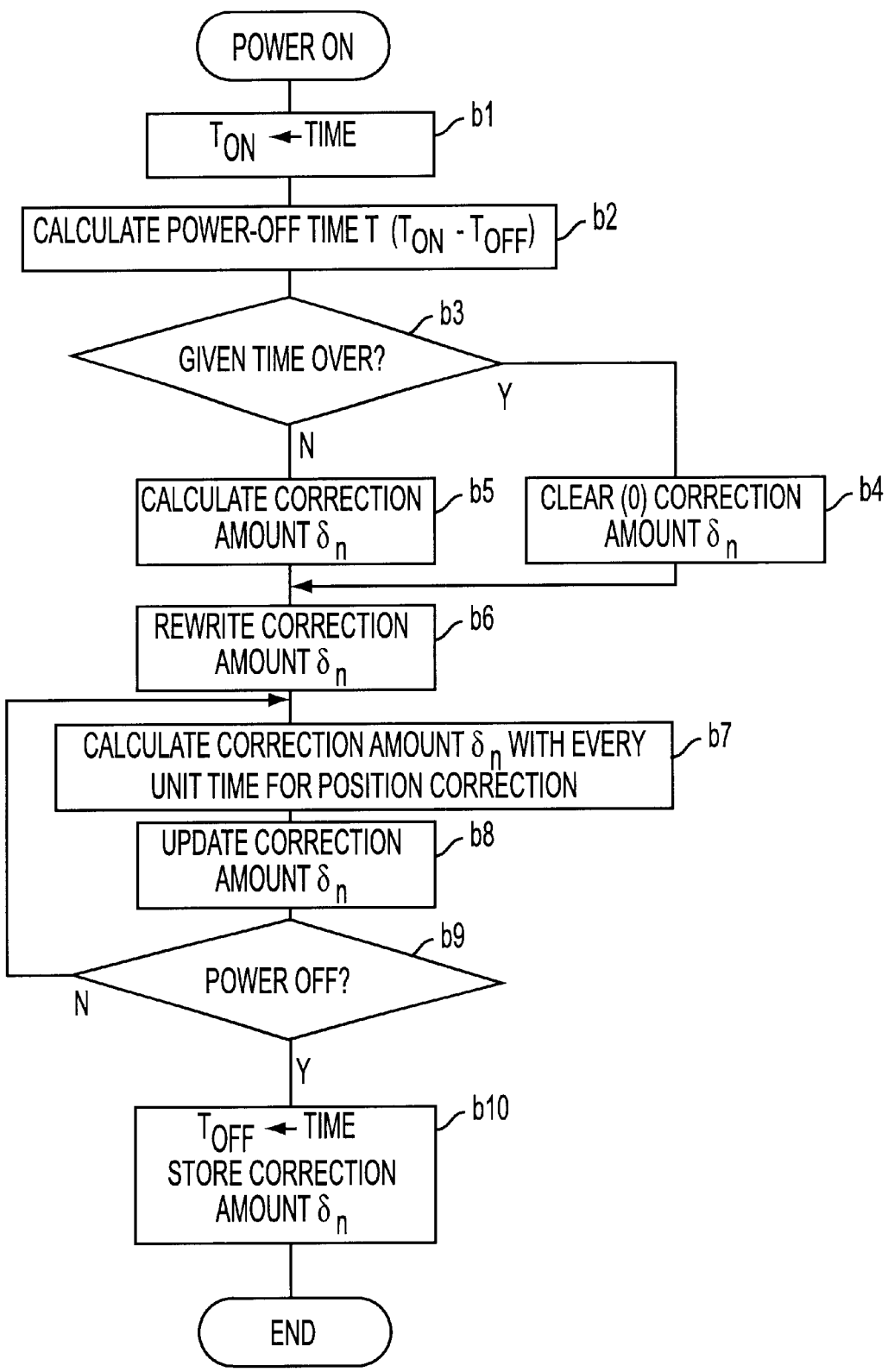
FIG. 14 shows an outline of a flowchart for a correction amount updating processing.

Referring now to the flowchart of FIG. 14, an outline of a correction amount updating processing, which is executed as a background processing for the operation of the vertical drilling machine (machine tool) 1, will be described.

When the machine tool is turned on, the current time Ton is read, and a time T during which the power has been turned off is obtained as the difference from the previously stored power-off time Toff (Steps b1 and b2). It is determined whether or not a set time (6 hours according to the present embodiment) is exceeded by the time T (Step b3). If the set time is exceeded, all the correction amounts are reduced to "0" (Step b4). If the set time is not exceeded, the arithmetic operation by expression (4) is carried out to obtain the correction amount $\delta$on for each moving shaft and the correction amount $\delta$on for the main spindle are obtained and rewritten as $\delta n$ (Steps b5 and b6).

When the unit time t(pc) (36 seconds according to the present embodiment) for position correction elapses, the arithmetic operation of expressions (1) and (3) are carried out to obtain the correction amount δn for each moving shaft and the correction amount δn for the main spindle. Further, the correction amounts based on the disturbance load torque is corrected by carrying out the arithmetic operation of expression (6), whereby the correction amount δn' for each moving shaft and the correction amount δn' for the main spindle are obtained to update the correction amounts (correction amounts δn for each moving shaft and the main spindle and the correction amount δn' corrected by the disturbance load amount) (Steps b7 and b8). Then, the program proceeds to Step b9, whereupon it is determined whether or not the power is turned off; if the power is not turned off, the program proceeds to Step b7, whereupon the aforementioned operation is repeated. If the power is turned off, on the other hand, the current time is stored as the power-off time Toff in the nonvolatile memory 14, and the currently stored correction amounts δn for each moving shaft and the main spindle are stored in the nonvolatile memory 14 (Step b10), whereupon the position correction amount updating process is finished.

In executing the machining programs in a foreground process, on the other hand, it is determined whether or not a thermal displacement correction mode is set. If this mode is set, the commanded position based on the machining programs is subjected to correction. In this case, each of the moving axes, such as X- and Y-axes, which do not serve to move the main spindle, is corrected as to its commanded position by executing, for the stored correction amount δn' for the moving axis, the operation of expression (2), thereby obtaining a position correction amount Δn. As for the axis (Z-axis) for moving the main spindle, its commanded position is corrected using a correction amount obtained by adding the correction amount δn' for the main spindle to the position correction amount Δn for the moving shaft obtained in the manner described previously.

In the embodiment described above, the correction amounts (of displacement) are obtained according to approximation formulas without detecting position displacements by means of sensors. However, in order to obtain thermal displacements more accurately, it is advisable to measure displacements or temperatures by means of position sensors or temperature sensors. A system in which thermal displacements or temperatures are measured to obtain correction amounts by means of conventional sensors has problems that the sensor measurement and computation of the correction amounts require a considerable length of time, and that the correction against displacement at the start of machining operation cannot be effected sufficiently due to fixed measurement intervals. Referring now to the flowchart of FIG. 15 for a correction amount updating processing, therefore, an embodiment will be described, in which correction against displacement with higher accuracy is made by combining the displacement prediction based on the aforesaid approximation formulas and the sensor measurement.

According to this embodiment, measurement by the sensor is carried out in the case where the difference between the correction amount δn predicted by the approximation formula and the previously predicted correction amount δn−1 is not lower than a given value, and this difference for the sensor measurement is set as a set value in the numerical control device 10 in advance. Further, in carrying out the correction against the thermal displacement, it is also set in advance whether or not correction is to be made based on the sensor measurement. When the vertical drilling machine (machine tool) 1 is turned on, the processor 11 starts the processing shown in the flowchart of FIG. 15 as a background processing. Steps c1 to c8 are identical with Steps b1 to b8 of FIG. 14.

After the correction amount is updated in Step c8, it is determined whether or not the system is set for the correction based on the measurement by the sensor (Step c9). When not set for the correction, the program proceeds to Step c13. When set for the correction by a sensor, on the other hand, it is determined whether or not the differences between the respective correction amounts δn of the feed shafts and main spindle, obtained during the unit time t(pc) for position correction, and the previously obtained correction amounts δn−1 are higher than a set value (Step c10). If none of the differences is higher, the program proceeds to Step c13. If any of the differences is higher, a measurement program similar to the conventional one based on sensors is executed to obtain displacements (Step c11). In this case, displacements of all the feed shafts and the main spindle may be measured, or displacements of only those shafts for which the differences between the correction amounts obtained by the approximation formula prediction are higher than the set value may be measured. Alternatively, temperatures may be measured by means of temperature sensors to obtain displacements.

The correction amounts thus obtained are updated as the correction amounts δn for the unit time t(pc) for position correction (Step c12). Then, the program proceeds to Step c13, whereupon it is determined whether or not the power is off. If the power is not off, the program returns to Step c7, whereupon subsequent processes are executed. If the power is turned off, the current time is treated as the power-off time Toff, and the currently stored correction amounts δn for the moving shafts and the main spindle are stored in the nonvolatile memory 14 (Step c14), whereupon the position correction amount updating processing is finished.

Figure 15:
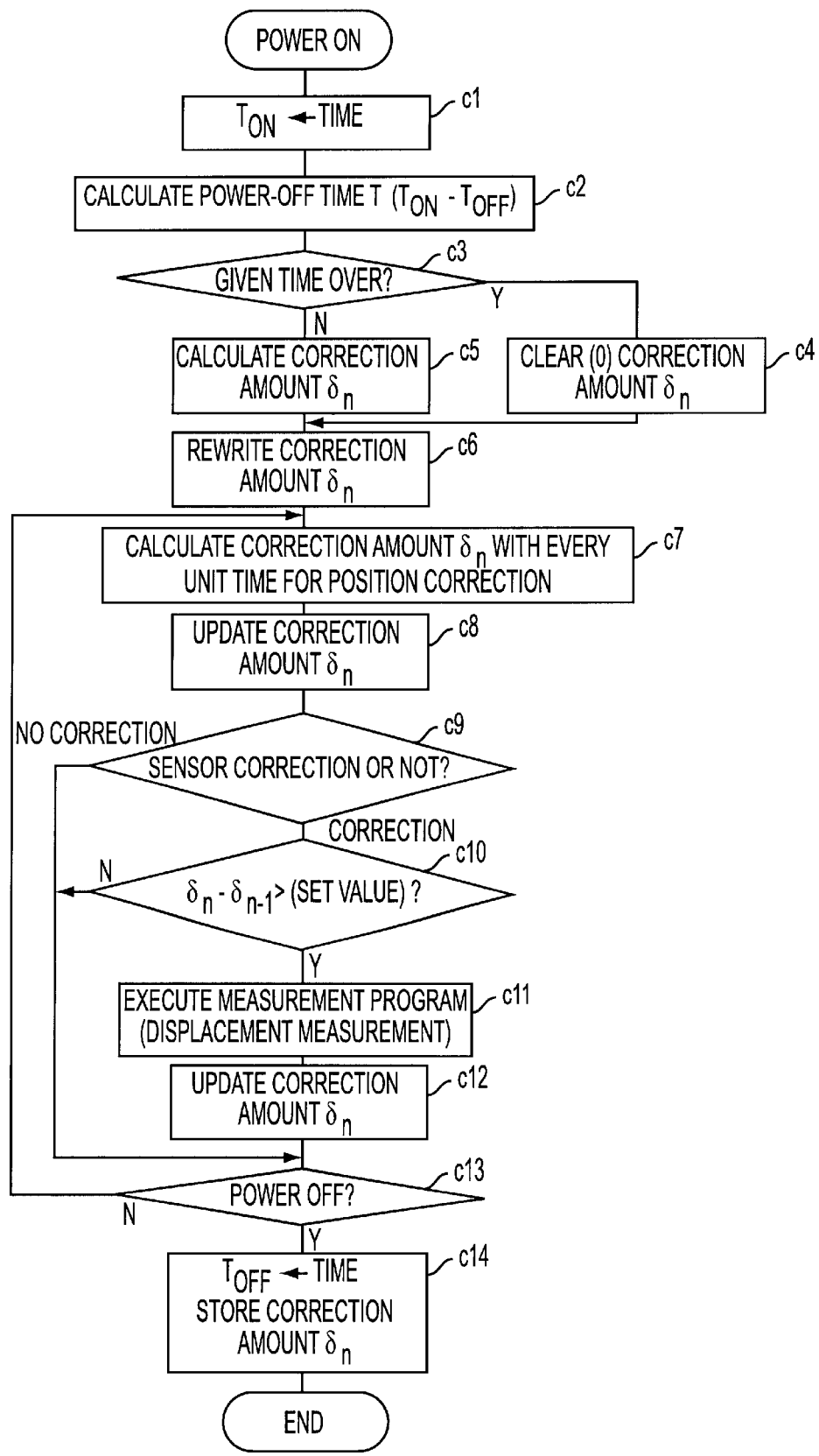
FIG. 15 shows an outline of a flowchart for a correction amount updating processing based on the use of sensors.

According to this embodiment shown in FIG. 15, when the variations of correction amounts are substantial, thermal displacements are measured by means of sensors and the measured displacements are updated as correction amounts, so that thermal displacement correction can be effected more accurately. Moreover, since the thermal displacement measurement by means of the sensors is made only when the correction amounts predicted by the approximation formulas are substantial, the frequency of measurement by means of the sensors is so low that extension of the machining time can be lessened. In this embodiment, whether or not to carry out measurement by means of sensors is determined based on the difference between the predicted correction amount for the current time and that for the time immediately preceding the current time by the unit time t(pc) for predicting correction amounts. Alternatively, however, the sensor measurement may be carried out when a set value is exceeded by a variation of the predicted correction amount that is obtained with every multiple of the unit time t(pc) for position correction. In this case, "1" is added to the value in the counter after process at Step c9. When a set value is exceeded by the value in the counter, the counter is reset, and the program proceeds to Step c10. Thereupon, a difference is obtained by subtracting the correction amount stored in the memory for the time of the preceding determination from the predicted correction amount obtained in Step c8. If the difference does not exceed a set value, the predicted correction amount obtained in Step c8 is stored as a correction amount to be used for the next determination, whereupon the program proceeds to Step c13. On the other hand, if the difference exceeds the set value, the program proceeds to Step c11, whereupon sensor measurement is carried out, and the obtained displacement is used for updating a correction amount (Step c12). This updated correction amount is stored in the memory as a correction amount to be used for the next determination, whereupon the program proceeds to Step c13.

Figure 13:
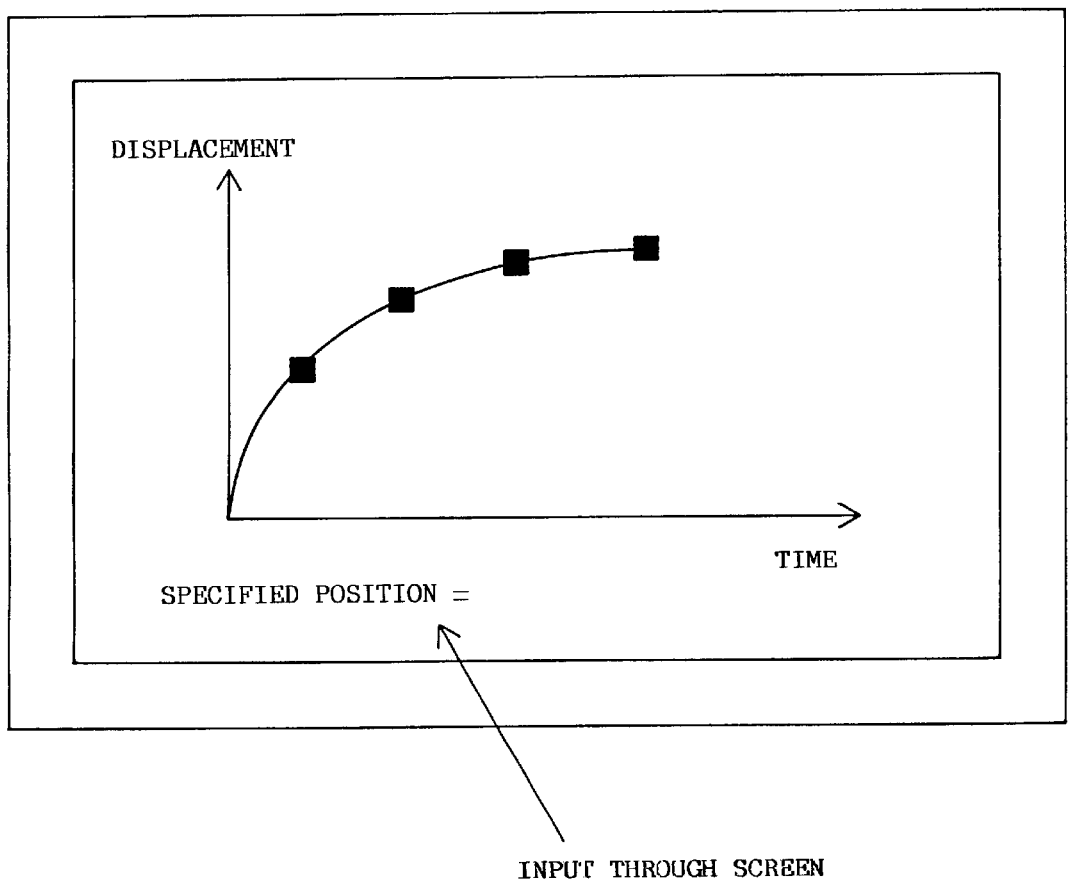
FIG. 13 is a diagram showing an example of display of position correction amounts on a display unit.

Further, according to the embodiment described above, the correction amount is predicted with every unit time t(pc) for position correction in Steps b7 and c7. Based on this predicted correction amount, the correction amounts for the feed shafts and the main spindle are displayed on the display screen of the CRT/MDI unit 70. When the shafts for which the position correction amounts are to be displayed, and the positions of the shafts, if these shafts are feed shafts, are specified and inputted through the CRT/MDI unit 70, the processor 11 reads the correction amounts updated in Steps b8 and c8 at every unit time t(pc) for position correction. If the shafts are feed shafts, the arithmetic operation of expression (2) is carried out in accordance with the inputted positions, and correction amounts for these positions are graphically displayed as shown in FIG. 13. In the case of the feed shaft (Z-axis) for moving the main spindle, the correction amount for the main spindle is added to the correction amount for this feed shaft and displayed. Further, the main spindle correction amounts stored in steps b8 and c8 are displayed directly as the correction amount for the main spindle.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A thermal displacement correction method for a machine tool controlled by a numerical control device, comprising:
    storing in the numerical control device a first approximation formula for obtaining a correction amount against a thermal displacement from a mean moving speed and a moving frequency of a feed shaft;
    storing in the numerical control device a second approximation formula for obtaining a position correction amount for a commanded position from the correction amount obtained according to the first approximation formula;
    monitoring the position of the feed shaft;
    determining the mean moving speed and moving frequency of the feed shaft;
    determining the position correction amount for the commanded position of the feed shaft according to the first and second approximation formulas; and
    correcting the commanded position by the position correction amount and outputting the corrected commanded position.

2. The thermal displacement correction method according to claim 1, further comprising
    storing in the numerical control device a third approximation formula for determining a correction amount against a thermal displacement of a main spindle from a rotational speed of the main spindle;
    monitoring the rotational speed of the main spindle;
    determining a correction amount from the monitored rotational speed of the main spindle according to the third approximation formula; and
    adding the correction amount from the monitored rotational speed of the main spindle to the position correction amount for the commanded position of the feed shaft for moving the main spindle, wherein the resulting amount is used as the correction amount for the feed shaft.

3. The thermal displacement correction method according to claim 1, further comprising
    storing in the numerical control device a third approximation formula for determining a correction amount against a thermal displacement of an axis during a power-off time of the machine tool;
    storing the time when the machine tool is disconnected from a power source and a correction amount for the time; and
    determining a correction amount from the previously stored correction amount and the power-off time according to the third approximation formula when the machine tool is reconnected to the power source, wherein the determined correction amount is used as the correction amount for the time of reconnection to the power source.

4. The thermal displacement correction method according to claim 1, further comprising changing a coefficient of the first approximation formula for determining the correction amount depending on a varied shaft lubrication method.

5. The thermal displacement correction method according to claim 1, further comprising detecting a disturbance load torque on the axis, and changing the correction amount in accordance with the magnitude of the detected disturbance load torque.

6. The thermal displacement correction method according to claim 1, further comprising
    measuring a position displacement or temperature through a sensor when a change of the correction amount determined according to the first approximation formula becomes equal to or higher than a set value; and
    determining a correction amount from the measured value.

7. The thermal displacement correction method according to claim 1, further comprising
    inputting data on an axis and a position into the numerical control device;
    determining a position correction amount for the inputted position according to the second approximation formula; and
    displaying the position correction amount on a display unit.

8. A machine tool controlled by a numerical control device, comprising:
    a feed shaft sensor that detects a position of a specific feed shaft of the machine tool with every preset sampling time $\Delta T$;
    a memory; and
    a processor that receives the position data from said feed shaft sensor, wherein said processor
        determines a mean moving speed and a moving frequency with every preset correction unit time t(pc) (t(pc)=N*$\Delta T$; N is an integer larger than 1),
        based upon the determined moving speed, the moving frequency, and the current position of the specific feed shaft, estimates and stores in said memory a thermal displacement of the specific feed shaft in the current position during the correction unit time, and
        corrects a position command for the specific feed shaft against the estimated thermal displacement during the next correction unit time t(pc).

9. The machine tool according to claim 8, wherein the moving frequency is defined as the ratio (K/N) between a total number (N) of sampling times ΔT in each correction unit time t(pc) and a number (K) of sampling times within which the detected moving speed of the specific feed shaft is not at zero.

10. The machine tool according to claim 8, wherein said processor stores in said memory, when the operation of the machine tool is stopped, a time at which the operation of the machine tool is stopped and the estimated thermal displacement at the time when the operation of the machine is stopped, and inputs, when the operation of the machine tool is resumed after the stoppage, a time at which the operation is resumed, and the stored estimated thermal displacement at the time when the operation is stopped, wherein said processor estimates and stores in said memory the estimated thermal displacement at the time when the operation is resumed using the inputted values.

11. The machine tool controlled according to claim 8, wherein said processor determines a correction amount against a thermal displacement of a main spindle from a detected rotational speed of the main spindle using a second approximation formula, and further corrects the position command using the correction amount of the main spindle.

12. The machine tool according to claim 8, further comprising a sensor that measures a position displacement of the specific feed shaft;

wherein said processor corrects the position command using the measured position displacement when the estimated thermal displacement exceeds a set value.

13. The machine tool according to claim 8, wherein said processor detects a disturbance load torque on the specific feed shaft; and corrects the position command in accordance with the detected disturbance load torque.

14. A computer readable medium encoded with processing instructions for implementing a thermal displacement correction method for a machine tool performed by a computer, the method comprising:

determining a mean moving speed and a moving frequency based upon received position data;

estimating a first correction amount for thermal displacement according to a first approximation formula using the mean moving speed and moving frequency;

estimating a position correction according to a second approximation formula using the first correction amount and a received commanded position; and correcting the received commanded position according to the position correction.

15. The computer readable medium according to claim 14, further comprising determining a second correction amount against a thermal displacement of a main spindle from a detected rotational speed of a main spindle using a third approximation formula; and adding the second correction amount from the monitored rotational speed of the main spindle to the position correction amount for the commanded position of the feed shaft for moving the main spindle, wherein the resulting amount is used as first the correction amount for the feed shaft.

16. The computer readable medium according to claim 14, further comprising storing a time when the machine tool is disconnected from a power source and a first correction amount for the time;

receiving a time of reconnection to the power source; and determining a first correction amount for the time of reconnection using the previously stored first correction amount and the power-off time according to a third approximation formula when the machine tool is reconnected to the power source.

17. The computer readable medium according to claim 14, further comprising changing a coefficient of the first approximation formula for determining the first correction amount depending on a varied shaft lubrication method.

18. The computer readable medium according to claim 14, further comprising detecting a disturbance load torque on the specific feed shaft, and changing the first correction amount in accordance with the magnitude of the detected disturbance load torque.

19. The computer readable medium according to claim 14, further comprising, when the change of the first correction amount determined according to the first approximation formula becomes equal to or higher than a set value, receiving a measured position displacement and determining the first correction amount from the measured value.

20. The computer readable medium according to claim 14, further comprising receiving inputted data on an axis and a position, determining a position correction amount for the inputted position according to the second approximation formula, and outputting the position correction amount for display on a display unit.

* * * * *